United States Patent [19]

Rozenberg

[11] Patent Number: 5,322,722
[45] Date of Patent: Jun. 21, 1994

[54] SYSTEM FOR ADHESIVELY MOUNTING PANEL LINERS

[75] Inventor: Yakov Rozenberg, West Bloomfield, Mich.

[73] Assignee: Foamade Industries, Inc., Auburn Hills, Mich.

[21] Appl. No.: 940,445

[22] Filed: Sep. 4, 1992

[51] Int. Cl.⁵ ............................ B32B 7/14; C09J 7/02
[52] U.S. Cl. ...................................... 428/40; 428/167; 428/174; 428/187; 428/202; 428/214; 428/218; 428/355; 428/343; 428/255; 296/39.1; 296/191
[58] Field of Search ............... 428/40, 174, 192, 194, 428/105, 255, 177, 109, 343, 167, 202, 214, 218, 355, 344, 181, 182, 247, 165, 31; 296/191, 39.1

[56] References Cited

U.S. PATENT DOCUMENTS 3,914,495 10/1975 Lania .................................... 428/255
5,011,724 4/1991 Wille .................................... 428/194

FOREIGN PATENT DOCUMENTS 0287041 10/1988 European Pat. Off. ............ 428/174
3600745 7/1986 Fed. Rep. of Germany ..... 296/39.1
2018481 1/1990 Japan ................................... 428/174

Primary Examiner—Ellis P. Robinson
Assistant Examiner—Nasser Ahmad
Attorney, Agent, or Firm—Harness, Dickey & Pierce

[57] ABSTRACT

A system for adhesively fastening water deflector type panel liners upon supporting panel surfaces of automotive vehicle doors and the like substrates, includes forming shallow, narrow channels in the liners and positioning thick strips of pressure sensitive adhesive within the channels. The liners are applied upon the panel surfaces and pressure is applied against the channels towards the panel surfaces to partially collapse the channels and flow the adhesive into contact with the panel surfaces. The adhesive flows into, and smooths any irregularities on the panel surfaces while adhering the liners thereto. The exposed faces of the adhesive strips may be covered with a wide mesh fabric to normally prevent the adhesive on one strip from sticking to adjacent surfaces of other similar liners in a stack or a roll of liners. When pressure is applied to the channels, the adhesive flows through the mesh into contact with the supporting panels.

7 Claims, 2 Drawing Sheets

SYSTEM FOR ADHESIVELY MOUNTING PANEL LINERS

BACKGROUND OF INVENTION

This invention relates to a system for adhesively mounting panel liners, such as water deflectors or water shields used within automotive vehicle door and body panels and the like types of panel liners.

It is conventional to use a water shield or water deflector panel liner within the doors of automotive vehicles to deflect water which enters the door cavity from seeping through the interior door trim and into the vehicle's interior surfaces. In general, an automotive vehicle door comprises a pair of metal panels which form an exterior and an interior door surface that are joined together along their edges and provide a cavity within which the door window may be lowered. The cavity may also contain window lowering and raising equipment, door locks, sound speakers and the like. Conventionally, the interior door surface is covered with a trim panel formed of cloth-like or plastic trim material, which may be backed with a rigid or semi-rigid trim panel.

In a typical door construction, water may enter the cavity through the opening through which the door window slides. Therefore, holes are formed in the bottom of the door cavity for draining the water from the door cavity. However, when water enters the door cavity, the water may run down along the interior surface of the door panel towards the drain holes but, unless something is done to deflect the water, it may seep into and through the trim panel. The water can stain or deteriorate the trim panel. To protect the trim panel, it is common to position a panel liner, usually formed of a treated paper or thin plastic film or foam sheet material, over the interior surface of the door and beneath the interior door trim panel. That panel liner functions to deflect the water entering the cavity so that the water runs down the liner to the bottom of the door without contacting the trim panel.

Sometimes the liner may be made of a lamination of one or more thin, film-like plastic sheets, adhered to the surface of a thicker foam plastic sheet or non-woven material sheet. That construction may be used to both deflect water and to reduce the transmission of sound through the door and to absorb sound from within the vehicle.

In the foregoing water shield or water deflector type panel liner, it is conventional to secure the panel liner to the surface of the inner panel of the door by means of pressure sensitive adhesive. The pressure sensitive adhesive is applied upon the panel liner at appropriate locations, including around its peripheral edge. During the assembly of the vehicle door, a workman places the liner in position over the surface of the interior panel of the door. Then he presses the liner towards the door panel surface so that the pressure sensitive adhesive adheres to the door panel and secures the panel liner in place.

It is conventional to provide pre-cut panel liner sheets, stackable one upon another for removal, one by one, for use when needed. Alternatively, the liner sheets may be provided in the form of rolls of a number of sheets joined end-to-end. When the sheets are furnished in rolls, a workman simply tears off each successive piece from the roll and applies it to the door.

Examples of panel liners are disclosed in U.S. Pat. No. 4,469,732 issued Sep. 4, 1984 to Isaksen et al for a "Method of Manufacturing Water Deflector for Vehicle Doors"; U.S. Pat. No. 4,604,302 issued Aug. 5, 1986 to Isaksen et al for a "Method of Manufacturing Water Deflector for Vehicle Doors"; U.S. Pat. No. 4,696,848 issued Sep. 29, 1987 to Jones et al for a "Surface Protector With Expansible Pocket"; and U.S. Pat. No. 4,798,130 issued Jan. 17, 1989 to Dixon for a "Door Water Deflector and a Vent." U.S. Pat. Nos. 4,469,732; 4,588,627; and 4,604,302 each illustrate a flexible plastic panel liner having pressure sensitive adhesive applied along the edge of the liner for adhesion to the door panel. The liners are formed in long strips arranged in rolls.

Another example of a similar type of liner or a cover sheet, which is similar to such a liner, is illustrated in U.S. Pat. No. 4,420,520 issued Dec. 13, 1983 to Jones et al for a "Area Coated Paint Mask and Method." This patent illustrates pre-cut cover sheets provided with pressure sensitive adhesive material applied along the peripheral edges of the sheets. The sheets are arranged in stacks.

An example of a panel cover or liner formed of a relatively thick foam plastic sheet, having a pressure sensitive adhesive material for adhering the sheet to supporting panels, for protection against damage, is disclosed in U.S. Pat. No. 4,313,987 issued Feb. 2, 1982 to McCormick for a "Poly-styrene Vehicle Body Protector System." Further, U.S. Pat. No. 3,160,549 issued Dec. 8, 1964 to Caldwell, et al for "Vibration Damping Structures" illustrates a lamination of thicker and thinner sheets, with pressure sensitive adhesive, for application upon supporting structures for sound absorption. Other examples of this general type of liner, which are formed of thin sheet material and are applied upon supporting panel surfaces by means of pressure sensitive adhesives, are known in the art.

Since pressure sensitive adhesive is commonly used for securing such panel liners to the supporting panel or substrate, it is necessary to protect the adhesive before it is adhered to the supporting panel. Particularly, it is necessary to prevent the adhesive on one sheet from sticking to the adjacent surface of the next sheet in either a stack or a roll. Hence, cover sheets or release paper may be used to cover the exposed surfaces of the adhesive until the time that the liner is to be applied to the supporting panel. Where such release paper is used, it is necessary for a workman to remove that paper before pressing the liner against the supporting panel. The paper may be in the form of a large sheet covering the entire liner or in the form of discrete strips covering only the adhesive. Alternatively, the entire liner sheet may be treated on one of its surfaces so that each liner acts as a large release paper or cover for the next liner.

Because panel surfaces or substrates, upon which the panel liners are applied, typically are not perfectly flat, but rather are relatively wavey or have relatively rough surfaces resulting from the manufacturing processes, it is desirable to use a thick deposit of adhesive so that the adhesive fills in the unevenness and, therefore, may accommodate to the underlying substrate surface. This avoids wrinkling or puckering of the liner or the failure of full surface-to-surface contact between the adhesive and the substrate. Protecting the exposed surface of a thick deposit of adhesive raises the problem of preventing the thick deposit of adhesive from flattening or spreading due to contact with adjacent liner sheets in a stack or a roll.

While the liner described herein is particularly useful for automotive door panel liners, the same adhesive related problems exists in lining other vehicle body portions where a liner-like sheet of one sort or another is required to cover a body panel. That is, problems arising out of the use of thick deposits of a pressure sensitive adhesive arranged upon stacked sheets may occur in other types of liners besides door liners.

The present invention is directed towards providing a system for protecting the adhesive deposit located upon panel liner sheets from flattening or spreading before application of the liner upon a support panel or substrate. The system may also include a way of eliminating the need for separable adhesive surface cover sheets or the need to form release surfaces on adjacent sheets.

SUMMARY OF INVENTION

This invention relates to a system for protecting a relatively thick deposit of a permanently tacky pressure sensitive adhesive applied upon panel liners, made of the thin, sheet-like plastic material, before the liners are applied against supporting panel surfaces or substrates. The invention contemplates applying a relatively thick, narrow strip or bead of pressure flowable adhesive within a shallow channel or groove formed in the surface of the liner. The exposed surface of the adhesive may be covered with a thin, wide mesh screen-type fabric whose warp and woof threads are widely spaced apart and rest upon the surface of the adhesive. These threads separate the adhesive from the adjacent surface of the next liner, in a stack of liners, to prevent the adhesive from sticking to the next liner. The panel liner is utilized by applying it against a supporting panel or substrate surface and then physically pressing the grooved areas against the supporting panel so that the groove collapses toward the panel supporting surface. That action causes the adhesive to flow around the threads of the screen or mesh whereby contacting and adhering to the supporting surface. The thick adhesive deposit fills the surface irregularities in the supporting panel surface.

This invention eliminates the need for a separate, removable release paper or release sheet and thus allows the liners to be maintained, ready for use, in either a stack or a roll of liners without flattening the adhesive before use and without adjacent liners sticking together.

This invention further contemplates forming a shallow channel or groove in the surface of the panel liner and positioning a bead or strip of pressure sensitive adhesive within the channel so that the adhesive is recessed within the channel and the adhesive strip is slightly narrower than the channel. Thus, when the sheet is applied against the supporting surface upon which it is to be permanently secured, physical pressure against the base of the channel causes the channel to flexibly collapse towards the supporting surface for moving the adhesive to the supporting surface.

One objective of this invention is to provide conventional adhesive, of the plastically flowable, pressure sensitive type, upon a conventional panel liner, but with the surface of the adhesive protected against sticking to adjacent surfaces, without the need for removable release papers or release covers or treatment of adjacent liners for release purposes so as to reduce the time, labor and expense involved in handling and utilizing such panel liners.

Another object of this invention is to use a thick deposit of a pressure sensitive adhesive, having an inexpensive, wide mesh screen or fabric covering, for fastening a thin, flexible plastic sheet upon a supporting substrate. The mesh covering normally protects the surface of the adhesive from sticking to another sheet in a stack or roll and allows, when appropriate physical pressure is applied, the adhesive to be squeezed through the mesh for adhering the panel liner to the substrate.

Still another objective of this invention is to provide a way of protecting a thick strip of adhesive, utilized for securing a panel liner to an irregularly shaped support surface by means of recessing the adhesive within a channel formed in the liner so that the channels may be collapsed flexibly towards the support surface for adhering the adhesive contained within the channel against the support surface.

These and other objects and advantages of this invention will become apparent upon reading the following description, of which the attached drawings form a part.

DETAILED DESCRIPTION

Figure 1:
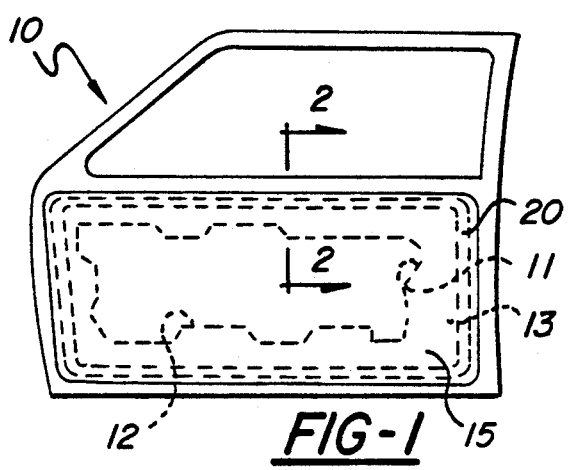
FIG. 1 is a schematic view of the interior of an automotive vehicle door and illustrates a panel liner or water shield adhered in place over the interior surface of the inner door panel, to protect the door trim which would be applied over the panel liner.

Referring to the drawings, FIG. 1 illustrates schematically a conventional automotive vehicle door 10 which, is formed of an inner panel and an outer panel joined together at their peripheral edges to provide a door cavity 11. The door window glass may move in and out of the cavity which contains the window glass operating mechanism, door locks, and other conventional equipment. The door inner panel normally has a central, irregularly shaped opening 12, which communicates with the door cavity and is surrounded by an irregularly shaped inner panel edge surface 13. This is a conventional construction and therefore, is illustrated schematically since the shape and size of the door panel and cavity varies from one vehicle to another.

A conventional panel liner, sometimes referred to as a water shield or water deflector 15, is applied over the cavity and the inner surface of the interior panel and panel edge surface 13. After the panel liner is adhesively secured in place, the door trim panel is applied over it. The door trim panel (not shown) conventionally consists of a relatively rigid panel which may be covered by a padded, cloth-like material.

Figure 2:
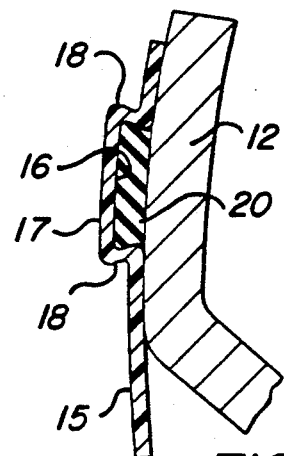
FIG. 2 is an enlarged, fragmentary view taken as if in the direction of arrows 2—2 of FIG. 1, illustrating the adhesive connection between the peripheral edge of the panel liner and the interior surface of an inner door panel.

As illustrated in FIG. 2, the liner illustrated comprises a thin, plastic sheet 15, having a groove or channel 16 formed therein. The channel may be molded or otherwise heat formed around the peripheral edge of the liner 15. Similarly, channels may be formed within the interior portions of the liner where adhesive fastening may be required. The drawings schematically show the adhesive only around the peripheral edge of the liner.

The groove 16 is formed with a base 17 and sidewalls 18. The groove may extend continuously around the peripheral edge of the liner or may be discontinuous. That is, the groove may be formed in short sections arranged end-to-end. Similarly, longer or shorter grooves may be formed within the middle portions of the panel liner, where the liner covers is to be fastened to the panel surface.

A thick adhesive strip 20 is arranged within the channel 16. The adhesive is of a plastic, pressure flowable material which is normally tacky and pressure sensitive. As an example, a conventional type of butyl adhesive material used in automotive panel liners may be used for this purpose. Other commercially available adhesives may be used. Commercially available, pressure sensitive adhesives are known and form no part of this invention. Those skilled in the art are able to select a suitable, commercially available, adhesive for this purpose. The adhesive strip is relatively thick, as for example, a 1/16th of an inch thick and, for example, may be roughly one quarter of an inch wide. When applied, the bead of adhesive may be generally oval in cross-section, that is, generally rectangular with rounded side edges, or may be approximately round in cross-section. The channel 16 is slightly deeper and wider than the thickness and width of the strip. Although the particular liner material may vary considerably, depending upon availability, cost, purpose, etc., an example of a commonly used liner is one made of about 5-6 mils. thickness polyethylene plastic sheet material. Also, the liner may be made of a much thicker material such as a lamination of a thin plastic film with a relatively thick foam plastic material or the like.

Figure 3:
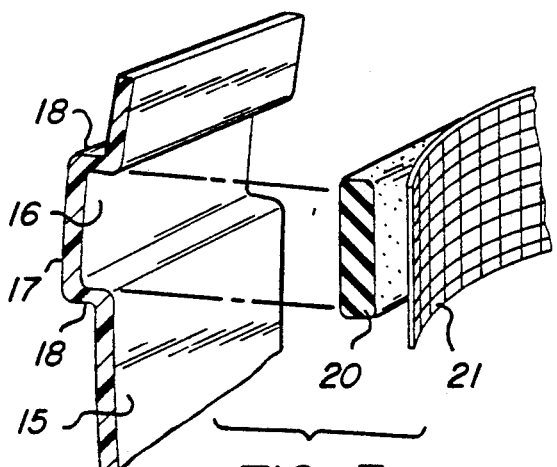
FIG. 3 is an enlarged, fragmentary, perspective view showing the edge portion of the panel liner, the adhesive strip and the mesh fabric covering, in disassembled position.

As illustrated in FIG. 3, the channel or groove 16 is pre-formed in the thin plastic liner sheet. Later, the thick adhesive strip 20 may be inserted within the channel. Preferably, the exposed surface of the adhesive strip is slightly recessed below the plane of the main body of the liner sheet.

Figure 6:
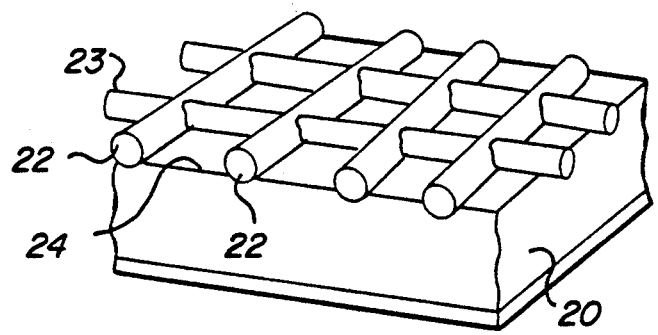
FIG. 6 is an enlarged, fragmentary view, showing the screen or mesh fabric arranged upon the exposed surface of the adhesive strip.

A strip of wide mesh or screen cloth-like material is applied over the adhesive. As schematically illustrated in FIG. 6, the mesh or screen cloth is formed of widely spaced apart warp 22 and woof 23 threads which are laid upon the surface 24 of the adhesive strip 20. The mesh material preferably has wide spaces between the threads. The threads may be interwoven in a conventional weaving pattern or may be formed by a technique which interconnects the threads in a co-planar manner. FIG. 6 of the drawings schematically shows the latter for illustrative purposes.

Figure 4:
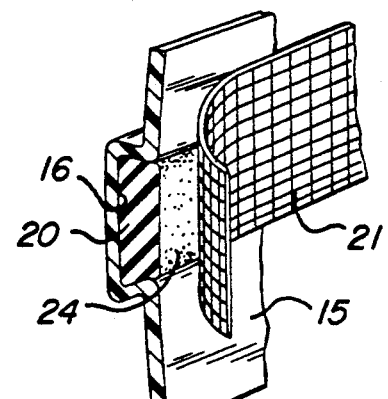
FIG. 4 is an enlarged, fragmentary view showing the adhesive strip positioned within a channel or groove formed in the panel liner and with its mesh or screen cover partially peeled back for illustration purposes.

As shown in FIG. 4, the strip of mesh fabric 21 preferably is wider than the exposed, transverse, surface 24 of the adhesive strip 20 so that it overlaps the edge portions of the liner sheet along the sides of the groove.

Figure 7:
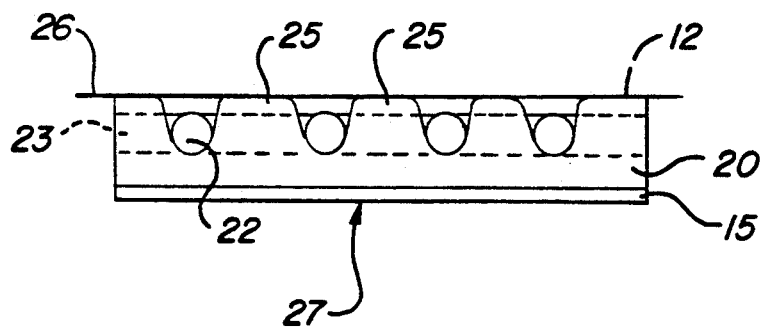
FIG. 7 is an enlarged, schematic, cross-sectional view showing the adhesive material flowed around the threads of the mesh or screen fabric for engagement with the support surface.

In operation, when the panel liner is to be applied to the support panel or substrate, a workman may remove the panel liner from a stack or from a roll, as the case may be, and position the liner against the supporting surface or substrate. Then, pressure is applied over the bases of the grooves or channels. As a result, the adhesive material is plastically flowed or squeezed through the spaces between the threads of the mesh, to form portions 25 that extend through the mesh and adhesively engage the supporting surface. This is schematically illustrated by the dotted line 26, which represents the supporting panel surface or substrate, and the arrow 27, in FIG. 7, which illustrates the pressure applied against the liner to cause the plastic flow of the adhesive through the mesh. The pressure partially collapses the channels and causes the thick adhesive strip to flow through the mesh, filling any surface irregularities of the substrate and thus allowing entire surface-to-surface contact.

Figure 5:
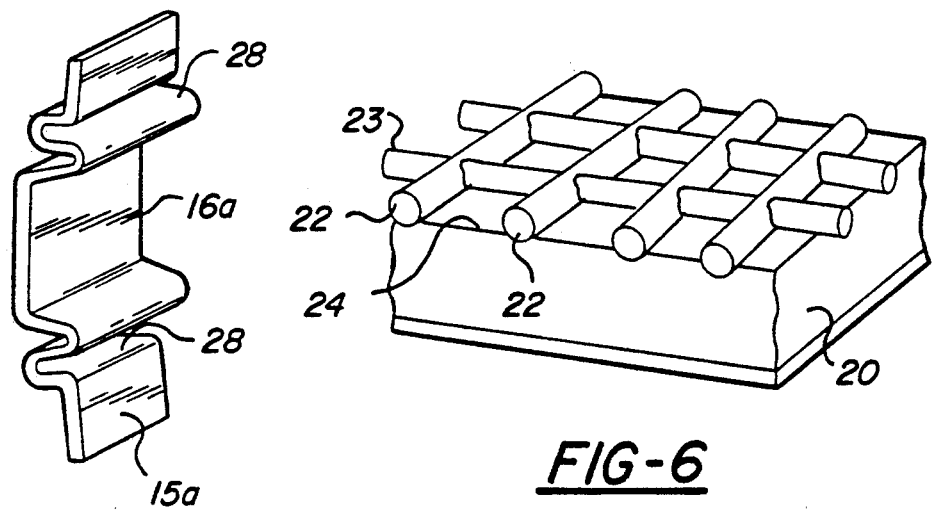
FIG. 5 illustrates a modified form of channel in the panel liner to provide additional flexibility in the channel area of the panel liner.

FIG. 5 illustrates a modified form of channel 16a in sheet 15a. Here, the channel 16a is provided with side channels 28 which form a hinge-like construction between the legs of the main channel 16a and the adjacent portions of the sheet. That is, when the channel is physically pressed or collapsed toward the supporting surface, the narrow, elongated side channels 28 provide hinge-like flexibility which enables the channels 16a to collapse more easily.

Figure 8:
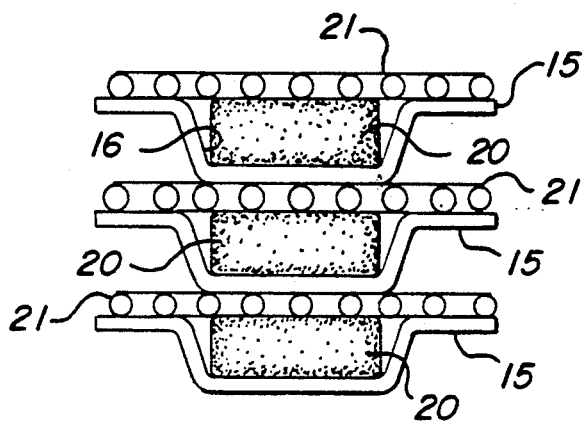
FIG. 8 is an enlarged, schematic, cross-sectional view, showing the edges of a series of panel liners stacked, one upon another, with their mesh or screen fabrics separating each successive sheet.

FIG. 8 schematically illustrates the adjacent edge portions of a stack of liners 15. The mesh fabric 21 over the otherwise exposed surfaces of the adhesive strips, prevent one liner from adhering to the next adjacent liner. Thus, a substantial size stack of liners may be formed and maintained until the liners are needed. At that time, the liners may be pulled off, one by one, from the stack for application upon supporting panels. For some purposes, the mesh fabric may be omitted and, instead, the adhesive contacting surfaces of the next adjacent sheets in a stack may be treated, in conventional manners, to release from, i.e., not stick to, the adhesive in the channels which it overlays.

Figure 9:
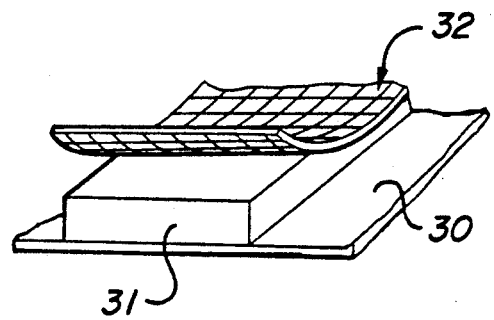
FIG. 9 show a modification wherein the adhesive strip is applied upon a flat sheet, utilizing a mesh or screen upon the exposed surface of the adhesive strip.
Figure 10:
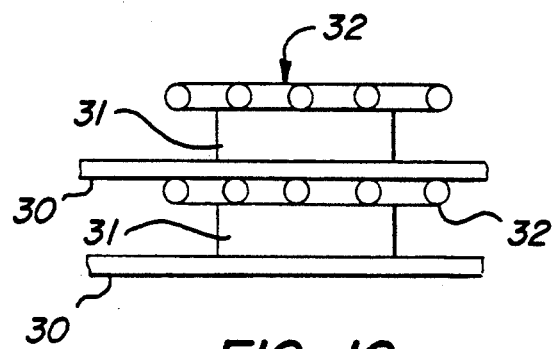
FIG. 10 is a schematic illustration showing flat sheets, of the type illustrated in FIG. 9, stacked, one upon another, and separated by the mesh or screen fabric.

FIG. 9 illustrates a modified sheet 30 which is relatively flat. The adhesive strip 31 is applied upon the surface of the sheet, without recessing the strip into a groove or channel. However, a mesh or screen cloth 32 is utilized to protect the exposed surface of the adhesive. Thus, as shown in FIG. 10, the sheets 30 may be stacked, one upon another, and separated by the threads of the mesh or screen cloth 32. When the sheets are to be applied upon their supporting panel or substrate, they are removed from the stack, one by one, and pressed against the supporting surface so as to plastically flow the adhesive through the spaces in the mesh for adhesively engaging the supporting panel or substrate. This system may be used where the pressure of a stack of liners is sufficiently low so as to avoid flattening the adhesive.

Figure 11:
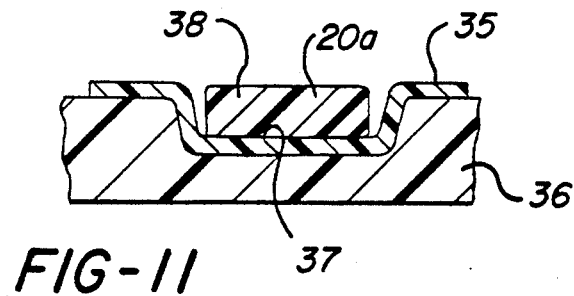
FIG. 11 illustrates a modification wherein the adhesive strip is inserted within a channel formed in a film-like sheet which is laminated to a thick foam plastic sheet to form a composite panel liner.

FIG. 11 illustrates another modification wherein the liner sheet 34 is formed of a thin film 35 laminated to a thick sheet 36 such as a foam plastic, sound attenuating sheet. A groove 37 in the liner receives the adhesive strip 38. That is, the exposed surface of the adhesive is recessed relative to plane of the film and the width of the adhesive strip is less than the width of the groove. Thus, when the sheet is applied against the supporting surface or substrate, pressure against the groove 37 collapses the groove and forces the exposed surface of the adhesive strip against the supporting panel or substrate.

Although this invention is particularly useful for applying water deflector types of liners upon vehicle doors, it may be utilized in similar types of panel liners which are to be applied adhesively against a supporting surface or substrate. Thus, it is desired that the foregoing description be read as illustrative of an operative embodiment of this invention and not in a strictly limiting sense.

Having fully described an operative embodiment of this invention, I now claim:

1. In a panel liner for application upon an automotive body panel and formed of a liner sheet made of a plastic material and being of a size to cover a pre-determined size and shape panel surface and having an inner surface for application upon, and adhesive fastening to, the panel surface and an outer, exposed surface; and a permanently tacky, pressure sensitive, thick, adhesive strip located upon and adhered to the sheet inner face and having an exposed face for application and adhesion against the adjacent panel surface, the improvement comprising;
    at least one groove formed substantially about the periphery in the sheet and opening toward the sheet inner face, with a depth of the groove being greater than the thickness of the sheet, and with said adhesive strip arranged within the groove;
    and with the sheet material defining the groove being flexible so that the groove may partially collapse under pre-determined pressure towards the panel surface for moving portions of the adhesive strip exposed face into adhering contact with the adjacent panel surface when the sheet is located upon said panel surface for fastening thereto.

2. In a panel liner as defined in claim 1, and including the thickness of the adhesive strip being less than the depth of the groove so that the adhesive face which is exposed within the groove, is recessed relative to the inner surface of the sheet so that the face of the adhesive may be physically forced into the plane of the inner face of the liner sheet to contact the panel support surface upon application of sufficient pressure to the groove in a direction towards the panel support surface.

3. In a panel liner as defined in claim 2, and including a thin fabric cover arranged over the adhesive strip exposed face, said fabric being formed of a wide screen material having widely spaced crossing threads, with the threads rested upon the exposed surface of the adhesive and normally separating the adhesive exposed face from the surfaces of any other materials applied thereon, without sufficient pressure to cause the adhesive to deform through the mesh;
    and with said adhesive being physically flowable around the threads for extending through the spaces in the fabric upon application of pre-determined pressure applied against the sheet portions which overlie the strip in a direction towards the panel surface, for adhering the adhesive to the panel surface.

4. In a panel liner as defined in claim 1, and including a side groove extending along each side of said groove in the sheet to form a flexible hinge connection between the groove connecting portions of the sheet and the adjacent body of the sheet, for enhancing the flexible movement of the adhesive strips toward the panel under pressure.

5. In a panel liner for application upon an automotive body panel and formed of liner sheet of a size to cover a pre-determined size and shape support panel surface and having an inner face for application against, and adhesive fastening to, the panel surface and an outer, exposed face; with a permanently tacky, thick, pressure sensitive adhesive strip located upon and adhered to the sheet inner face and the strip having an exposed face for application against the adjacent support panel surface, the improvement comprising:
    at least one groove formed substantially about the periphery in the sheet and opening at the sheet inner face, with the depth of the groove being greater than the thickness of the sheet and with said adhesive strip arranged within the groove
    a fabric cover arranged over the adhesive strip exposed face, with said fabric being formed of a wide mesh screen material having widely spaced warp and woof threads that are rested upon said strip exposed face for normally separating said exposed face from the outer face of an adjacent liner sheet applied against the sheet inner face without substantial pressure, that is, pressure sufficient to plastically flow the adhesive;
    said adhesive being plastically flowable around the threads for extending through the spaces between the threads of the mesh upon application of pre-determined pressure applied against the sheet portions which overlay the adhesive strip and directed towards the panel surface for adhering the adhesive to the panel surface
    and the sheet material defining the groove being flexible under said pressure for moving portions of the adhesive strip exposed face around the threads of the mesh fabric and through the mesh spaces into adhering contact with the adjacent panel surface for securing the sheet to the panel surface.

6. In a panel liner as defined in claim 5 and with said cover being wider than the width of the exposed face of the sheet and the width of the groove so that edge portions of said cover overlap the sheet edge areas defining the sides of the groove therein.

7. In a panel liner as defined in claim 5, and said strip being more narrow than the groove and being of a thickness which is less than the depth of the groove.

* * * * *